United States Patent [19]

Wen

[11] Patent Number: 4,737,699
[45] Date of Patent: Apr. 12, 1988

[54] CAPACITIVE POSITION TRANSDUCER

[75] Inventor: Lin Wen, Xian, China

[73] Assignee: Xian Instrumentation Factory, China

[21] Appl. No.: 846,604

[22] Filed: Mar. 31, 1986

[30] Foreign Application Priority Data

Apr. 1, 1985 [CN] China .................. 85100991

[51] Int. Cl.⁴ .............................. G05B 1/06
[52] U.S. Cl. .................. 318/662; 340/870.37
[58] Field of Search ............ 318/662; 340/870.37

[56] References Cited

U.S. PATENT DOCUMENTS

| | | | |
|---|---|---|---|
| 3,760,392 | 9/1973 | Stich | 318/138 X |
| 3,845,377 | 10/1974 | Shimotori | 318/662 |
| 3,938,113 | 2/1976 | Dobson et al. | 340/870.37 |
| 4,386,312 | 5/1983 | Briefer | 340/870.37 |

FOREIGN PATENT DOCUMENTS

53091  6/1982  European Pat. Off. .
2324472 11/1973 Fed. Rep. of Germany .
53-112769 10/1978 Japan .

Primary Examiner—William M. Shoop, Jr.
Assistant Examiner—Saul M. Bergmann
Attorney, Agent, or Firm—Kenyon & Kenyon

[57] ABSTRACT

A capacitive position transducer for detecting position changes or producing position feedback signals in a servorecorder comprises a rhombic transmitter electrode connected to a voltage source and a plurality of rectangular receiver electrodes insulated from and adjacent to each other. Current flowing through the coupled transmitter and receiver electrodes is rectified by diode circuits and flows through a circuit of serially connected resistors, thereby forming an output voltage signal at an end of the resistor circuit. The linearity of the output voltage signal can be changed by changing the value of the resistors in the resistor circuit. The capacitive position transducer can also provide commutating signals required by brushless linear motor.

20 Claims, 6 Drawing Sheets

CAPACITIVE POSITION TRANSDUCER

BACKGROUND OF THE INVENTION

The present invention relates to a capacitive position transducer for detecting position changes, particularly, to a capacitive position transducer used for producing position feedback signals in a control system or in a recorder or for detecting relatively long distance position changes in a device.

A well-know capacitive position transducer comprising a pair of differential capacitors has two disadvantages: first, the shapes of the electrodes must meet stringent requirements of high accuracy; and second, because the variation of the distance between electrodes affects the output signal significantly, it is difficult to obtain high accuracy. In another kind of capacitive position transducer (see Japanese Patent Application No. 112769), arbitrary nonlinearity is obtained by an additional voltage divider. This second capacitive position transducer has the following shortcoming: the voltage divider with either resistors or capacitors is influenced by parasite capacitors and, consequently, it is necessary to adjust an adjustable device to implement an exact voltage dividing. Other shortcomings are the same as in the differential capacitive position transducer, namely, sensitivity to the variation of the shapes of, and distance between, the electrodes. As a result, it is difficult to attain an accurate detection of position changes with such known transducers.

A linear motor, particularly, a brushless linear motor (a linear motor with an electronic commutator), is the most desirable servomotor in electronic servorecorder. However, a brushless linear motor needs a commutating signal, and the use of a commutator will increase the complexity of the device significantly. The increased complexity forms the main obstacle to the application of brushless linear motors in recorders.

An object of the present invention is to provide a capacitive position transducer in which the above-mentioned drawbacks are overcome.

It is another object of the present invention to improve the accuracy of the detection of such a capacitive position transducer without enhanced requirements for high machining precision during the manufacturing of the transducer and at the same time to achieve a high accuracy of nonlinear output characteristics. In addition, it is also intended to improve the reliability and environmental immunity of the transducer to attain a high cost-effectiveness.

Yet another object of the present invention is to provide a new technique for producing commutating signals by transducer itself, which makes the use of a brushless linear motor more economic in recorders or other control systems.

SUMMARY OF THE INVENTION

A capacitive position transducer according to the present invention comprises a capacitive sensing assembly which includes a first electrode connected to a high frequency voltage source and a plurality of second electrodes insulated from and closely adjacent to each other to form an aligned configuration wherein the first and second electrodes are arranged to face each other and the first electrode is shiftably disposed for motion along the aligned configuration of the second electrodes. A plurality of pairs of diodes each having an anode terminal and a cathode terminal is provided with the anode terminal of one of each pair of diodes being connected to the cathode terminal of the other diode to form a diode junction thereby. The other two terminals of each pair of diodes, referred to as first and second terminals, respectively, include a first terminal of a first polarity and a second terminal of a second polarity. A first network comprises a plurality of serially connected resistors with a plurality of resistor junctions formed therebetween, each resistor junction corresponding to a respective one of the second electrodes in a sequential order. The first network has one end connected to a reference point and another end used as an output terminal.

Each of the first terminals of the pairs of diodes is connected to a corresponding resistor junction of the first network, while each of the second terminals of the pairs of diodes is connected via a second network to the reference point, and each of the diode junctions is connected to a corresponding second electrode. As the first electrode is moved along the aligned configuration of the second electrodes, currents flowing through the coupled first and second electrodes are rectified by corresponding diodes and then flow through corresponding resistor junctions and resistors of the first network to form a total voltage drop signal related to the relative position between the first and second electrodes, the total voltage drop signal being available as output at the output terminal of the first network.

In addition, commutating signals required by a brushless linear motor can be obtained from the second network.

DETAILED DESCRIPTION OF PREFERRED EMBODIMENTS

Figure 1:
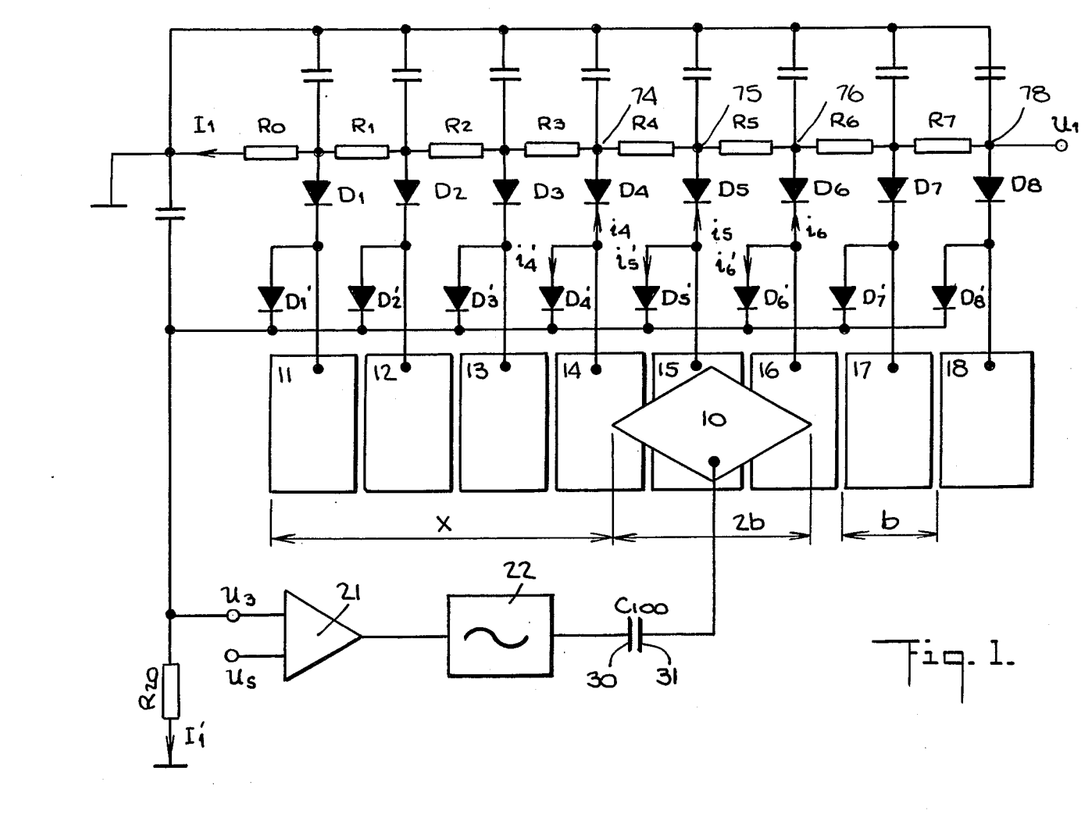
FIG. 1 is a circuit diagram of a first embodiment of a capacitive position transducer according to the invention.

FIG. 1 shows the first embodiment of the capacitive position transducer according to the present invention. The capacitive sensing assembly for position measuring comprises a first electrode 10, used as a transmitter electrode and a plurality of second electrodes 11, 12, 13, 14, 15, 16, 17 and 18, used as receiver electrodes. The receiver electrodes are insulated from and closely adjacent to each other. A first electrical network in the position transducer includes several resistors $R_0$, $R_1$, $R_2$, $R_3$, $R_4$, $R_5$, $R_6$ and $R_7$ connected in series to each other, one lead of resistor $R_0$ being connected to circuit ground. All of the junctions of the resistors are separately connected to first plates of capacitors whose other plates are connected to circuit ground. A second network in the position transducer includes a grounded resistor $R_{20}$ in parallel with a capacitor.

Second electrode 14 is connected to a cathode terminal of a diode $D_4$ having an anode terminal connected to a junction 74 between resistors $R_3$ and $R_4$ of the first network. Electrode 14 is also connected to an anode terminal of a diode $D'_4$ having a cathode terminal connected to resistor $R_{20}$. The above-described circuit is repeated for each of the second electrodes 11–18.

When a high frequency voltage is fed to the first electrode 10, an AC current at each of the several second electrodes coupling with the first electrode is rectified into two respective DC currents, one of which flows from the corresponding resistor junction through the first network to ground, the other flowing through resistor $R_{20}$ to ground. An output signal $U_1$ as a function of position to be measured is produced at an output terminal 78.

Because DC current can not pass through a capacitor, DC current cannot flow from electrode 14 (or any other second electrode) to electrode 10. Concomitantly, the mean value of current $i_4$ flowing through diode $D_4$ is equal to the mean value of current $i'_4$ flowing through diode $D'_4$ and currents $i_4$ and $i'_4$ flow only in opposite directions. Accordingly, the total current $I_1$ flowing through the first network is always equal to current $I'_1$ flowing through resistor $R_{20}$. The voltage drop across resistor $R_{20}$, i.e., output signal $U_3$ associated with the total current $I_1$, is compared by an amplifier 21 with a constant voltage $U_s$ fed to an input terminal of the amplifier. The output of amplifier 21 controls the amplitude of a high frequency voltage output of an oscillator 22. As a result of this voltage control, the total current $I_1$ flowing through the first network is controlled to maintain a constant value. The total current $I_1$ does not change with external variations such as changes in the distance between first and second electrodes, variations of parameters of electronic components for oscillator 22 and fluctuations in ambient conditions. All such variations are compensable by the variation of the amplitude of the high-frequency voltage at the oscillator's output.

At any particular time only a few resistor junctions of the first network are injected with current drawn from respective second electrodes, because the first electrode 10 can be coupled with only a limited number of second electrodes. Movement of the first electrode is equivalent to a change in the resistance value of the resistors through which the total current $I_1$ passes. If the first network comprises resistors $R_1$–$R_7$ with same value, the output characteristic of the position transducer is linear. If resistors $R_1$–$R_7$ of the first network have unequal resistances, the output characteristic of the transducer is nonlinear. If the shapes of both the first and the second electrodes are rectangular, the output characteristic is a smooth straight line only in the case of linear output. In the case of a nonlinear output, the output characteristic curve is made up of several broken lines, whose sections are equal in number to the resistors of the first network. If first electrode 10 is rhombic and second electrodes 11–18 are rectangular, regardless of whether the output is linear or nonlinear, the characteristic curves all are smooth. Accordingly, a rhombic first electrode is preferred. The length of the diagonal of the rhombic first electrode 10 in the direction of motion thereof is approximately equal to an even multiple of the center-to-center distance between several second electrodes which are bridged by one resistor of the first network.

When first electrode 10 in FIG. 1 is moved to the right, the relationship between output $U_1$ and position X is:

$$U_1 = I_1 \left[ \sum_{k=0}^{n} R_k + \tfrac{1}{2} R_{n+1} + \frac{1}{b} R_{n+1}(X - nb) + \tfrac{1}{2}b^2(R_{n+2} - R_{n+1})(X - nb)^2 \right] \quad (1)$$

where parameter $I_1$ is the total current flowing through the grounded end of the first network, parameter b is the common width of the second electrodes covered by the first electrode, and n is a positive integer 0, 1, . . .

Whenever the output is linear, i.e., $$R_{n+1} = R_{n+2} = R_{n+3} \ldots, \quad (2)$$

$$U_1 = I_1 \left[ \sum_{k=0}^{n} R_k + \tfrac{1}{2} R_{n+1} + \frac{1}{b} R_{n+1}(X - nb) \right]$$

When $R_{n+1} \neq R_{n+2} \neq R_{n+3} \ldots$, the output characteristic is nonlinear as indicated in equation (1), but the differential quotient of output voltage $U_1$ to position X is linear:

$$\frac{d}{dx} U_1 = I_1 \left[ \frac{1}{b} R_{n+1} + \frac{1}{b^2}(R_{n+2} - R_{n+1})(X - nb) \right] \quad (3)$$

It is approximately fitted with the required curve in variation of curvature. As a result, it is a smooth curve.

If first electrode 10 is at the position shown in FIG. 1, where the first electrode is coupled with second electrodes 14, 15 and 16, three DC currents $i_4$, $i_5$ and $i_6$ are derived. These currents flow to ground from resistor junctions 74, 75, 76, respectively, via resistors $R_5$, $R_4$, $R_3$, $R_2$, $R_1$ and $R_0$. At this time, the current flowing through resistors $R_3$ to $R_0$ is the total current $I_1$, which is equal to the sum of currents $i_4$, $i_5$ and $i_6$, while the DC current flowing in resistor $R_5$ is current $i_4$ and the DC current flowing in resistor $R_4$ is the sum of currents $i_6$ and $i_5$. The output voltage $U_1$ at terminal 78 is equal to the sum of all voltage drops across resistors $R_0$–$R_7$.

If the first electrode is moved to the right, current $i_4$ will be gradually reduced, current $i_5$ will be increased or reduced slightly and current $i_6$ will be gradually increased. Consequently, the currents in resistors $R_4$ and $R_5$ are increased, but the total current $I_1$ flowing through resistors $R_3$ to $R_0$ remains unchanged. The sum of the voltage drops across resistors $R_5$ to $R_0$, of course, will be increased and output voltage or total voltage drop $U_1$ will be changed with positional variation of the first electrode 10. Resistor $R_0$ of the first network is only used for determining the voltage of the start point and does not affect the range of measurement and the linearity of the output characteristic.

As long as the total current $I_1$ is controlled to remain constant, the accuracy of the output signal will only be affected by the accuracy of the distribution ratio among currents $i_4$, $i_5$ and $i_6$ but not by the sum of them. Hence, the variation of distance between the second electrodes 11–18 and first electrode 10, without relative rotation, cannot affect the above-mentioned distribution ratio.

A large portion of output voltage $U_1$ is a voltage drop across several resistors through which total current $I_1$ flows. In the case shown in FIG. 1, these resistors are designated $R_3$ to $R_0$. The error of the voltage drop across the resistors through which current $I_1$ flows does not depend upon the relative positions of first electrode 10 and second electrodes 11–18. The relative positions can only influence the voltage drops across the resistors $R_4$ and $R_5$ bridged by the coupled second electrodes 14, 15, and 16, and the voltage drops across resistors $R_4$ and $R_5$ are only a very small portion of the maximum value of output voltage $U_1$. Therefore, a high accuracy of position output is easily obtained. As shown in FIG. 1, all positive rectified currents $i'_4$, $i'_5$ and $i'_6$ are summed up as total current $I'_1$ which passes through resistor $R_{20}$. Current $I'_1$ is always equal to current $I_1$ in magnitude and opposite to current $I_1$ in direction.

In practice, the effects caused by the positive voltage drop across and the junction capacitance of the diodes can be reduced, because the high frequency voltage amplitude is much larger than the positive voltage drop across a diode.

Figure 2:
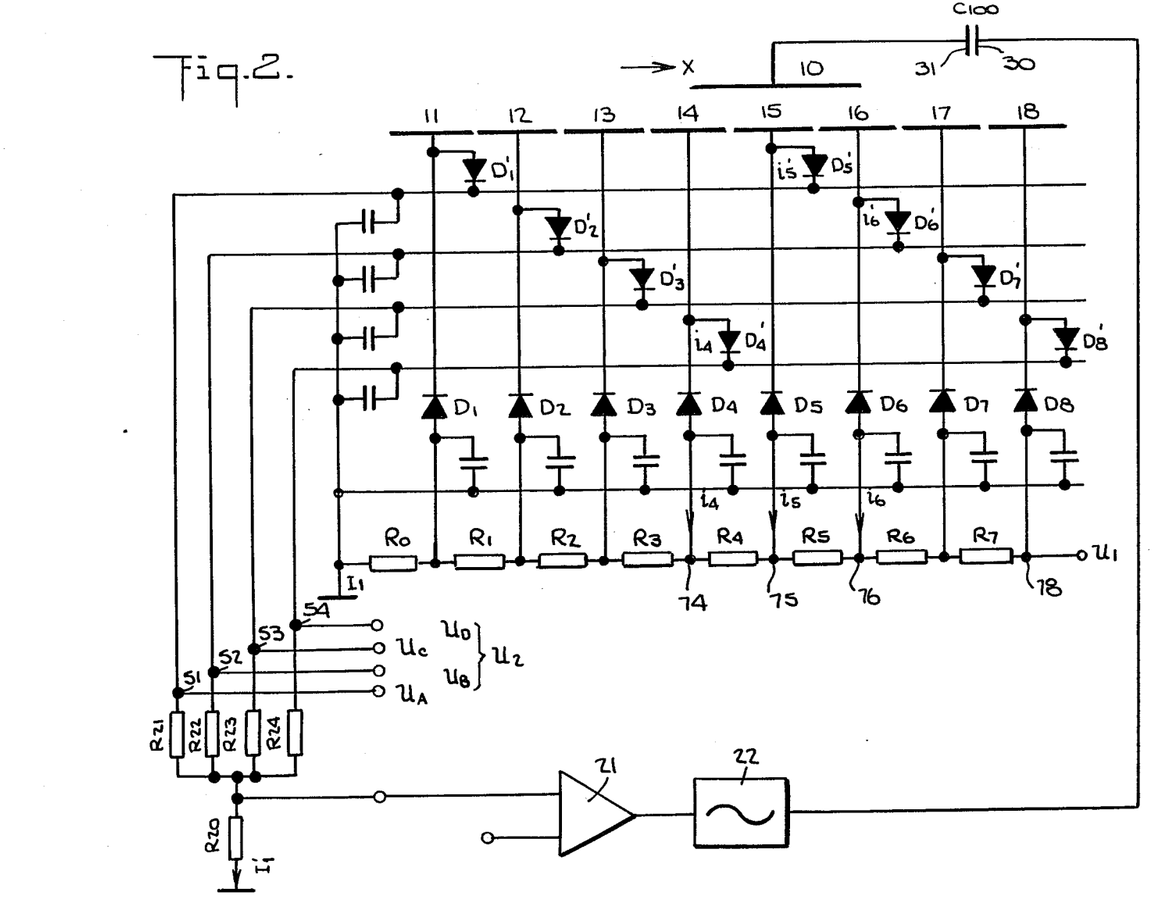
FIG. 2 is a circuit diagram of a second embodiment of a capacitive position transducer according to the invention.

A second embodiment of a position transducer in accordance with the invention, shown in FIG. 2, can produce, from the second network, commutating signals for a brushless linear motor (not illustrated). The second network comprises resistors $R_{21}$, $R_{22}$, $R_{23}$, and $R_{24}$ with respective first and second ends, second terminals of all pairs of diodes $D_1$ and $D'_1$, $D_2$ and $D'_2$, ... $D_8$ and $D'_8$, i.e., the cathodes of diodes $D'_1$, $D'_2$, ... $D'_8$, being sequentially connected to the first ends of resistors $R_{21}$, $R_{22}$, $R_{23}$ and $R_{24}$ with a period equal to the number of the resistors $R_{21}$, $R_{22}$, $R_{23}$ and $R_{24}$ in the second network. The second ends of these resistors are connected to ground through resistor $R_{20}$. A multicomponent output signal $U_2$ is the sum of signal $U_3$ and separate voltage drops produced across resistors $R_{21}$, $R_{22}$, $R_{23}$ and $R_{24}$ by the rectified currents flowing from the cathodes of the diodes $D'_1$, $D'_2$, ... $D'_8$ corresponding to those second electrodes facing first electrode 10. In the specific configuration shown in FIG. 2, currents $i'_4$, $i'_5$, and $i'_6$ flow from diodes $D'_4$, $D'_5$, and $D'_6$ to resistors $R_{24}$, $R_{21}$ and $R_{22}$, respectively. Since the second electrodes 11–18 are equally interlaced spacially, output signal $U_2$ comprises several output signals $U_A$, $U_B$, $U_C$ and $U_D$ formed by the sum of an alternating voltage component with a certain spacial coordinate related phase difference and a direct voltage component with a constant amplitude. If a brushless linear motor and the transducer of FIG. 2 are used in the same device, the transducer can perform the function of a commutator. When N commutating signals are required, the number of resistors $R_{21}$, $R_{22}$, ... in the second network should equal N.

Figure 3:
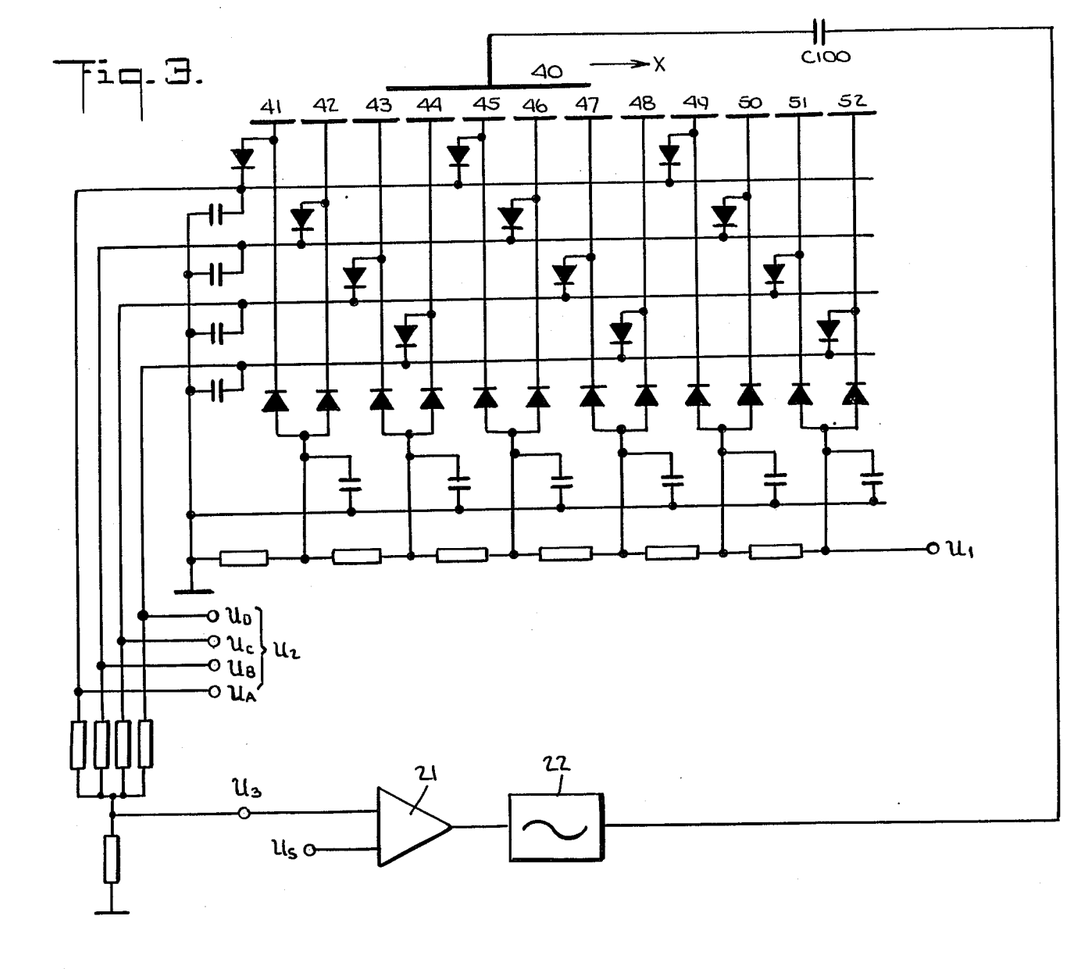
FIG. 3 is a circuit diagram of a third embodiment of a capacitive position transducer according to the invention.

A third embodiment of a capacitive position transducer pursuant to the present invention, shown in FIG. 3, meets the requirements of a brushless linear motor for reducing the commutating period. The number of second electrodes of the position transducer may equal the number of the resistor junctions of the first network or a multiple thereof. In FIG. 3, the number of the second electrodes 41, 42, ... 52 is twice as many as the number of resistor junctions of the first network. Hence, the variation period of output signal $U_2$ is reduced by half with respect to the embodiment of FIG. 2, whereby the commutating period for a brushless linear motor is reduced by half. In this case, the length of first electrode 40 is four times the length of the second electrodes, because each resistor except $R_0$ must be connected across two pairs of the second electrodes.

Figure 4:
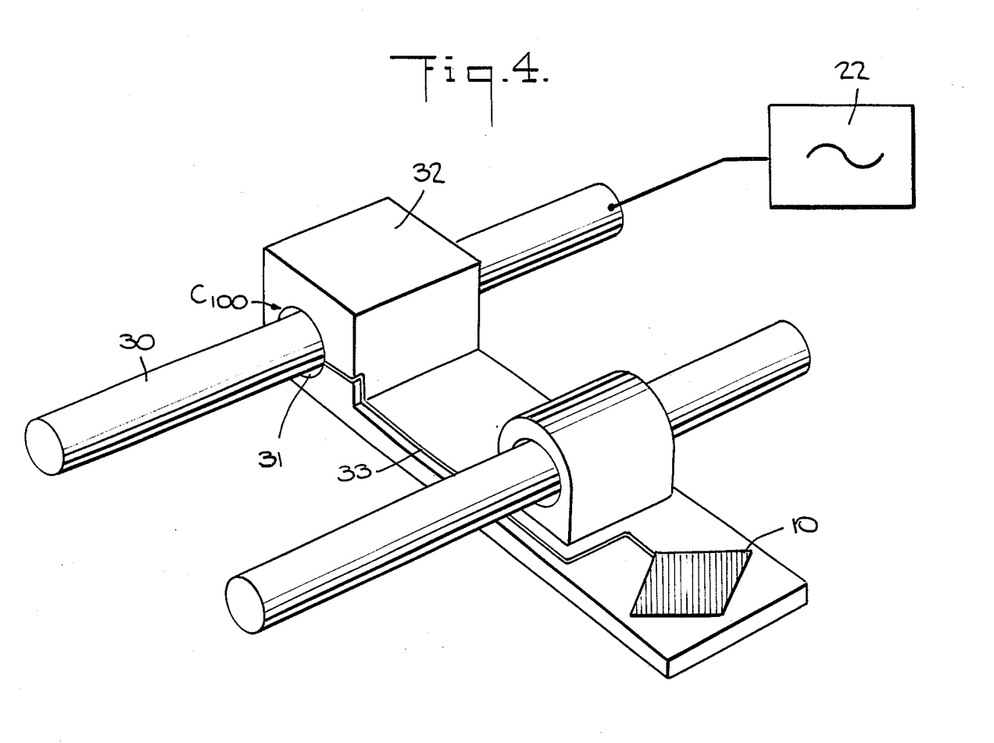
FIG. 4 is a perspective view of a carriage assembly for a movable electrode in a fourth embodiment of the inventions.

FIG. 4 illustrates a technique for saving or eliminating a wire for feeding high-frequency voltage to the mobile first electrode 10. The high-frequency voltage is applied to a supporting axle 30 partially surrounded by a sleeve 32 lined on an inner wall with a conductive layer 31 and disposed in a insulated mobile cartridge. Axle or shaft 30 and conductive layer 31 form a capacitor $C_{100}$. The high-frequency voltage passes through capacitor $C_{100}$ and a piece of conducting wire 33 to the first electrode 10.

Figure 5:
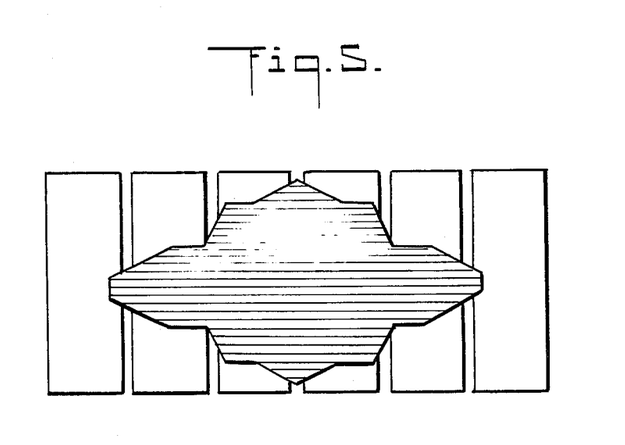
FIG. 5 is a plan view of a first electrode and several second electrodes in fifth embodiment of the invention.

When the leading end or corner of the first electrode 10 is moved from one of second electrodes to an adjacent one, an error arises due to the delayed conducting of the diodes. To solve this problem, both leading and trailing ends of first electrode 10 should be slightly enlarged and prolonged, as illustrated in FIG. 5. Moreover, in the third embodiment of the invention, described hereinabove with reference to FIG. 3, two or more rectified currents from the second electrodes flow into one resistor junction of first network, which current flow causes error not completely eliminated by enlarging and prolonging the leading and trailing ends of the movable electrode. Pursuant to the invention, a modified region is added at an intermediate position along edges of the first electrode, i.e., one width of a second electrode from a symmetric center line of the first electrode in the direction of motion. The modified region consists of three sections of broken line, which sections locally increase the slope of the edges of the rhombically shaped first electrode.

Figure 6:
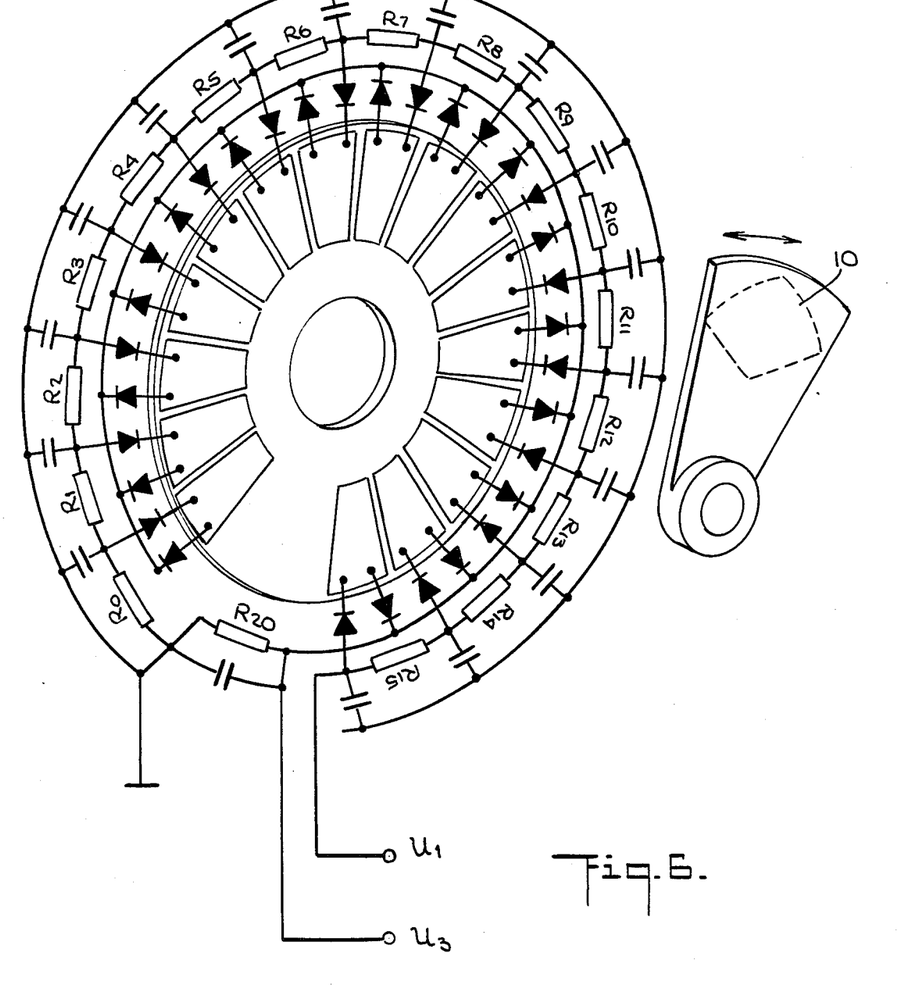
FIG. 6 is partially a circuit diagram and partially an exploded perspective view of a sixth embodiment of the invention.
Figure 7:
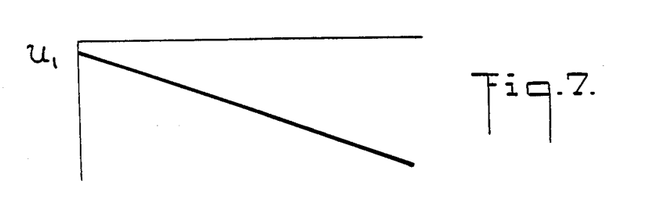
FIG. 7 is a graph of an output voltage signal $U_1$ of linear characteristics for the capacitive position transducer shown in FIG. 1.
Figure 8:
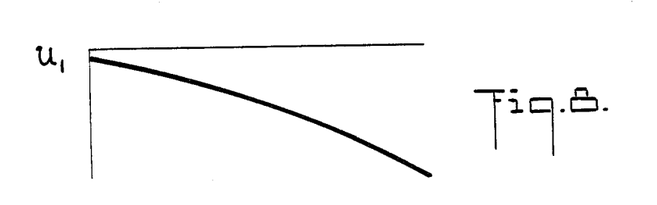
FIG. 8 is a graph of an output voltage signal $U_1$ of nonlinear characteristics for the capacitive position transducer shown in FIG. 1.
Figure 9:
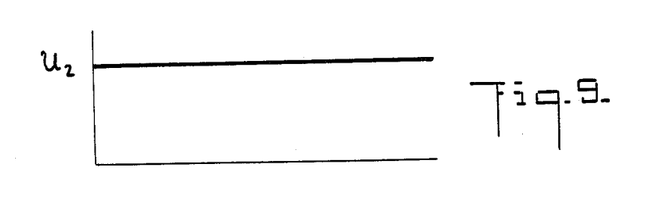
FIGS. 9 and 10 are graphs of output voltage signals $U_2$ and $U_3$, respectively, for the capacitive position transducer shown in FIG. 2 or FIG. 3.
Figure 10:
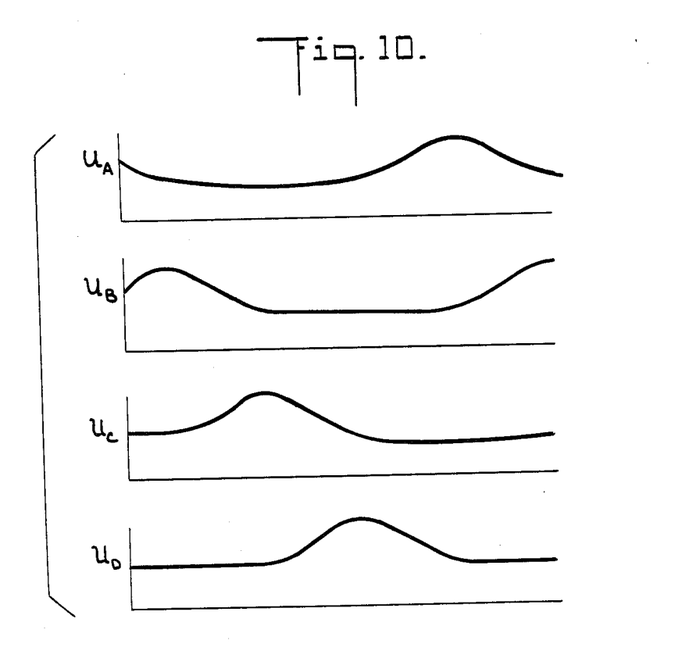

As shown in FIG. 6, sectorial second electrodes may be disposed in a circular array and cover an entire circumference.

The advantages of the invention are as follows:

(1) Due to the fact that the first network is used to sum output signals from all of the second electrodes, the absolute error does not increase with the number of second electrodes, as long as total current remains invariant, and the relative error is inversely proportional to the number of second electrodes. Accordingly, an increasingly accurate position output signal is obtained by increasing the number of second electrodes.

(2) A capacitive position transducer in accordance with the invention provides an output signal $U_3$, used by the closed loop control system to make the total current invariant. As a result, variation of the distance between the first electrode and the second electrodes does not affect accuracy. For this reason, the requirements for flatness of the second electrodes and straightness of supporting axle are reduced.

(3) The variations in the operating characteristics of most electronic components and deformation of parts, due to environmental influences, which may affect the total current $I_1$, present no hazard. As such, a transducer pursuant to the present invention has a greatly enhanced immunity to environmental influences.

(4) Because total current is a constant value, it is possible to exploit the capacitor comprised of supporting axle 30 and sleeve 32 with inner conductive liner 31 to conduct high-frequency voltage. Indeterminateness of the capacitance of the capacitor has no influence on the total current $I_1$. As a result, the wire for feeding the high-frequency voltage to first electrode may be eliminated.

(5) When a transducer pursuant to the present invention is in operation, only a few second electrodes are coupled with the first electrode, the high-frequency current passes through the coupled electrodes and only the diodes connected to the coupled second electrodes are turned on, all the others being turned off. It is accordingly impossible to introduce interference signals received from other, uncoupled, second electrodes into the first network. As a result, the signal to noise ratio is very high, which is a very important advantage for a servosystem with deep feedback. Serial derivative feedback, which cannot be used in a general servosystem, can be used in a capacitive position transducer according to the invention to suppress the generation of system self-oscillation. Serial derivative feedback is an indispensable measure for the stable operation of a brushless linear motor in a high speed servosystem. The very large signal to noise ratio, and the commutating signal obtainable in a position transducer of the present invention make the utilization of brushless linear motors in recorders technically and economically possible.

(6) The total current $I_1$ being stabilized DC current fed via the first network, each resistor's value can be precalculated exactly, according to the required nonlinearity, such as calibrated dial table of thermocouple. No experimental data or adjustment is required during the assembly process. Therefore, the process of manufacturing a recorder is facilitated.

I claim:

1. A capacitive position transducer comprising:
   a capacitive sensing assembly including a first electrode connected to a high-frequency voltage source and a plurality of second electrodes insulated from and closely adjacent to each other to form an aligned configuration, said first electrode and said second electrodes facing each other, said first electrode being shiftably disposed for motion along said aligned configuration of said second electrodes;
   a plurality of pairs of diodes each having an anode terminal and a cathode terminal, the anode terminal of one of each pair of diodes being connected to the cathode terminal of the other diode of the respective pair to form a diode junction thereby, the other two terminals of each pair of diodes including a first and a second terminal, all the first terminals of the pairs of diodes being of a first common polarity and all the second terminals of the pairs of diodes being of a second common polarity; and
   a first network comprising a plurality of serially connected resistors with a plurality of resistor junctions formed therebetween, said resistor junctions corresponding to respective ones of second electrodes in a sequential order, said first network having one end connected to a reference point and another end used as an output terminal, each of said first terminals of said pairs of diodes being connected to a corresponding one of said resistor junctions of said first network means, each of said second terminals of said pairs of diodes being connected via a second network to said reference point, each of the diode junctions of said pairs of diodes being connected to a corresponding second electrode, whereby as said first electrode is moved along the aligned configuration of said second electrodes, currents flowing through the coupled first and second electrodes are rectified by corresponding diodes and then flow through corresponding resistor junctions and resistors of said first network to form a total voltage signal related to the relative position between said first and second electrodes, said total voltage signal being available at said output terminal of said first network.

2. The transducer according to claim 1, also comprising a closed-loop control means operatively coupled to said second network and to said first electrode for controlling the total current flowing through said first network and for maintaining said total current at a constant value.

3. The transducer according to claim 2, wherein said closed-loop control means comprises an amplifier and a high-frequency voltage oscillator, said amplifier having an output signal controlling the amplitude of an output signal of said high-frequency oscillator, said amplifier having an input signal related to said total current, said high-frequency oscillator being connected at an output to said first electrode for delivering said output signal thereto.

4. A transducer according to claim 1, wherein said first electrode has a substantially rhombic shape.

5. The transducer according to claim 4, wherein said first electrode has in the moving direction a diagonal with a length approximately equal to an even multiple of the distance between centers of second electrodes bridged by one resistor in said first network.

6. The transducer according to claim 5, wherein said first electrode has a pair of opposed ends spaced from one another along the direction of motion of said first electrode, said opposed ends being enlarged and lengthened to reduce error caused by transition of an end of said electrode from one of said second electrodes to an adjacent one of said second electrodes.

7. The transducer according to claim 6, wherein the number of said second electrodes is equal to a multiple of the number of said resistor junctions in said first network, said first electrode having an plurality of edges and a modified region at each such edge, said edges having increased slopes in the respective modified regions, the modified region along each edge having a center spaced from a symmetric center line of said first electrode along the moving direction thereof by a distance substantially equal to the width of one of said second electrodes, thereby reducing the error caused by transition from one of said second electrodes to an adjacent second electrode during motion of said first electrode.

8. The transducer according to claim 1, wherein said first electrode is operatively connected to said high-frequency voltage source via a long supporting axle and a capacitor formed by said axle and a conductive lining on an inner wall of a sleeve surrounding said axle.

9. The transducer according to claim 1, wherein a relationship between said output voltage signal and said relative position changes into a linear relationship from a nonlinear relationship upon changing the values of said resistors in said first network.

10. The transducer according to claim 1, wherein said second network includes a conductive wire.

11. The transducer according to claim 1, wherein said second network includes at least a resistor.

12. The transducer according to claim 1, wherein said second network includes N resistors each with a first end and a second end, the second terminals of all said pairs of diodes being sequentially connected to the first ends of said N resistors with a periodicity of N, the second ends of said N resistors being connected to said reference point through an additional resistor to produce from the first ends of said N resistors commutating signals for a brushless linear motor.

13. A capacitive position transducer comprising:
a plurality of receiver electrodes insulated from and closely spaced to each other to form an aligned configuration;
a transmitter electrode shiftably disposed for motion along said aligned configuration, said transmitter electrode facing said receiver electrodes;
a high-frequency voltage source operatively connected to said transmitter electrode;
rectification means operatively coupled to said receiver electrodes for rectifying high-frequency signals produced at receiver electrodes juxtaposed to said transmitter electrode;
first network means operatively coupled to said rectification means for forming a sum of rectified high-frequency signals transmitted from said rectification means, said first network means including a plurality of serially connected resistors with a plurality of resistor junctions each located between two adjacent resistors in said first network means, said rectification means being connected to said first network means at said resistor junctions, said first network means having an output terminal at one end of said aligned configuration; and
second network means operatively connected to said rectification means and to said high-frequency voltage source for controlling the output thereof to stabilize at a constant value total current flowing through said serially connected resistors.

14. The transducer according to claim 13 wherein said receiver electrodes have rectangular shapes of substantially the same area.

15. The transducer according to claim 13 wherein said transmitter electrode is substantially rhombic.

16. The transducer according to claim 15 wherein said transmitter electrode has a diagonal extending parallel to the direction of motion of said transmitter electrode along said aligned configuration, said resistors each bridging at least one of said receiver electrodes, said diagonal having a length which is an even multiple of a distance between centers of said receiving electrodes bridged by one of said resistors.

17. The transducer according to claim 1, further comprising means for reducing error caused by transition of said transmitter electrode from one of said receiver electrodes to an adjacent one thereof during motion of said transmitter electrode along said aligned configuration.

18. The transducer according to claim 1 wherein said receiver electrodes are equal in number to a multiple of said resistor junctions, said means for reducing error comprising modified regions along edges of said transmitter electrode, said transmitter electrode having a symmetric center line, each modified region having a respective center, a distance between said symmetric center line and the center of one of said modified regions along the direction of motion of said transmitter electrode being equal to a distance between symmetric center lines of adjacent ones of said receiver electrodes.

19. The transducer according to claim 13 wherein said high-frequency voltage source is operatively connected to said transmitter electrode via an elongate supporting axle and a sleeve slidably secured to said axle, said sleeve having an inner wall provided with a metal layer.

20. The transducer according to claim 13 wherein said receiver electrodes are arranged in a circular configuration, said aligned configuration being a curvilinear one.

* * * * *

UNITED STATES PATENT AND TRADEMARK OFFICE
CERTIFICATE OF CORRECTION

PATENT NO. : 4,737,699

DATED : April 12, 1988

INVENTOR(S) : WEN

It is certified that error appears in the above-identified patent and that said Letters Patent is hereby corrected as shown below:

```
Column 1, line 11, change "well-know" to --well-known--.

Column 2, line 46, change "inventions" to ---invention--.

Column 6, line 15, change "a" to --an--.

Column 8, line 44, change "an" to --a--.

Column 10, line 14, change "claim 1" to --claim 13--.

Column 10, line 20, change "claim 1" to --claim 13--.
```

Signed and Sealed this

Fourth Day of October, 1988

Attest:

DONALD J. QUIGG

*Attesting Officer*          *Commissioner of Patents and Trademarks*